Dec. 22, 1959  B. D. MOORE ET AL  2,917,907
ICE BLOCK HARVESTER
Filed Feb. 10, 1958  3 Sheets-Sheet 1
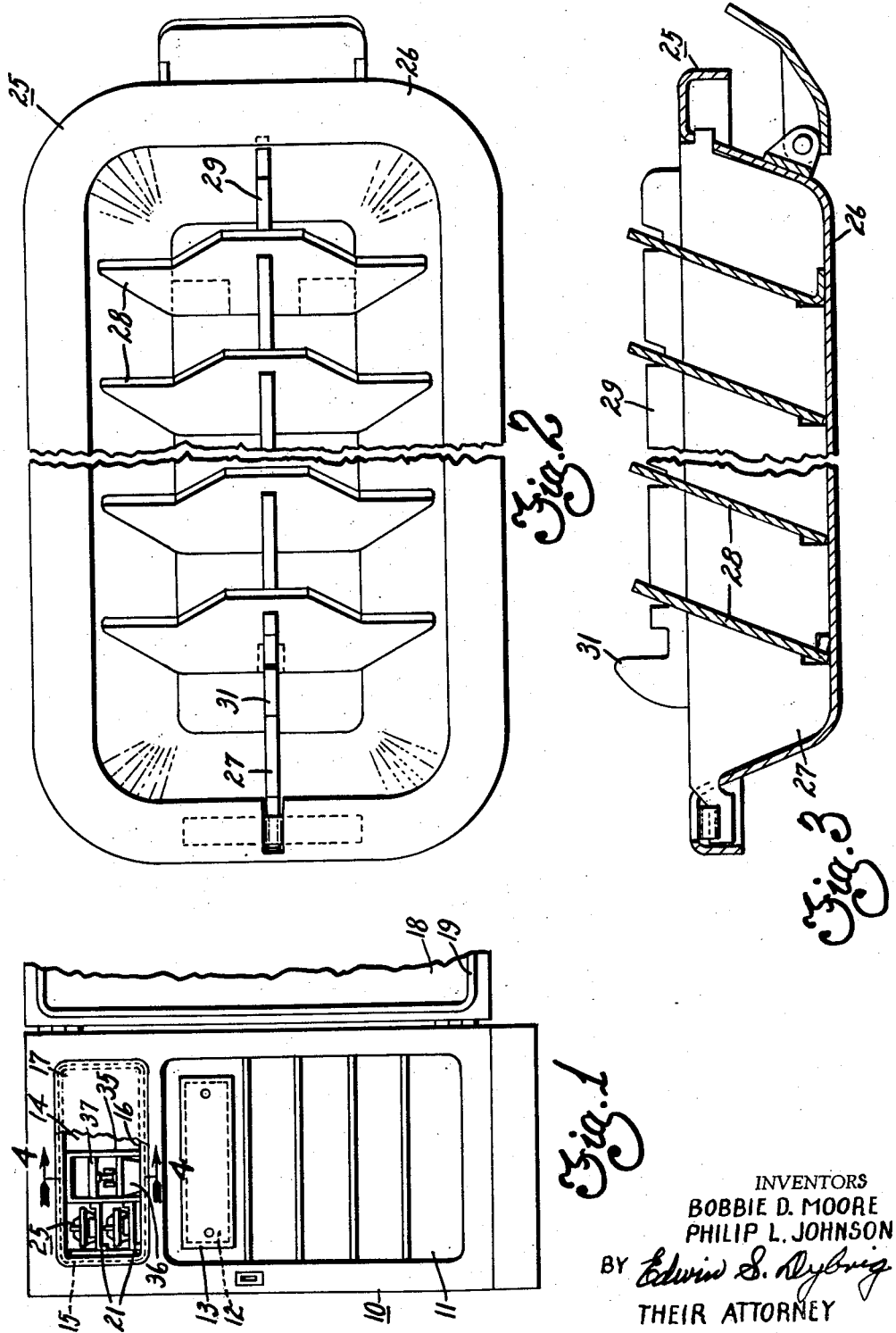
INVENTORS
BOBBIE D. MOORE
PHILIP L. JOHNSON
BY Edwin S. Dybrig
THEIR ATTORNEY INVENTORS
BOBBIE D. MOORE
PHILIP L. JOHNSON
BY Edwin S. Dyking
THEIR ATTORNEY Dec. 22, 1959  B. D. MOORE ET AL  2,917,907
ICE BLOCK HARVESTER
Filed Feb. 10, 1958  3 Sheets-Sheet 3

INVENTORS
BOBBIE D. MOORE
PHILIP L. JOHNSON
BY
THEIR ATTORNEY

United States Patent Office

2,917,907
Patented Dec. 22, 1959

2,917,907

ICE BLOCK HARVESTER

Bobbie D. Moore, Kettering, and Philip L. Johnson, Medway, Ohio, assignors to General Motors Corporation, Detroit, Mich., a corporation of Delaware Application February 10, 1958, Serial No. 714,378

6 Claims. (Cl. 62—344)

This invention relates to refrigeration and particularly to an arrangement for harvesting ice blocks from freezing devices employed in household refrigerators.

There have been lever operated mechanisms provided on or in household refrigerator cabinets for ejecting ice blocks from unitary freezing devices of the type including a tray and a movable walled grid locked in the tray against detachment therefrom. While such mechanisms have been successful and welcomed by the public, as unique innovations in conjunction with the use of refrigerators and the dispensing or serving of ice blocks, many housewives are still displeased with present day advancements in ice block harvesting methods and object to any of those which require a housewife to exert much energy to release ice blocks from a freezing device. We, therefore, contemplate the provision of an improvement in the ice block harvesting art for use with household refrigerator cabinets whereby a housewife is entirely relieved of applying force to a mechanism for ejecting ice blocks from a tray of a freezing device.

The prime object of our invention is to provide an improved arrangement for mechanically releasing ice blocks from a freezing device of the tray and grid type employed in household refrigerators which eliminates the necessity of manually applying force to the device or to parts thereof.

Another object of our invention is to provide a method for mechanically harvesting ice blocks from a freezing device wherein ice blocks are ejected from the device automatically in response to merely placing the freezing device in a supported position at a location at which the ice blocks are desired to be released.

A further object of our invention is to provide a mechanism having a part thereof movable by an electrical means for applying force to grid walls locked in a tray of a unitary freezing device for moving the walls therein to release ice blocks from the device which electrical means is energized automatically in response to invertedly placing the freezing device on a stationary support at a location where ice blocks are to be ejected into a storage receptacle or portable ice bucket.

In carrying out the foregoing objects it is a still further object of our invention to render the electrical means of the ice block releasing arrangement ineffective to eject ice blocks from a freezing device, when placed in position at the ejection location, in response to removing a portable ice block receiving, storage and dispensing bucket from such location.

Further objects and advantages of the present invention will be apparent from the following description, reference being had to the accompanying drawings, wherein a preferred form of the present invention is clearly shown.

In the drawings:

Figure 1 is a front view of a multiple chambered household refrigerator cabinet with its main door open and a part of the freezing chamber door broken away showing a freezing device support and an ice block storage receptacle therebelow of the present invention;

Figure 2 is a broken top plan view of a unitary tray and grid type freezing device employed in the present ice block harvesting arrangement;

Figure 3 is a broken side view of the freezing device shown in Figure 2 with the tray in section showing means for locking the grid thereof in the tray against detachment therefrom;

Figure 4:
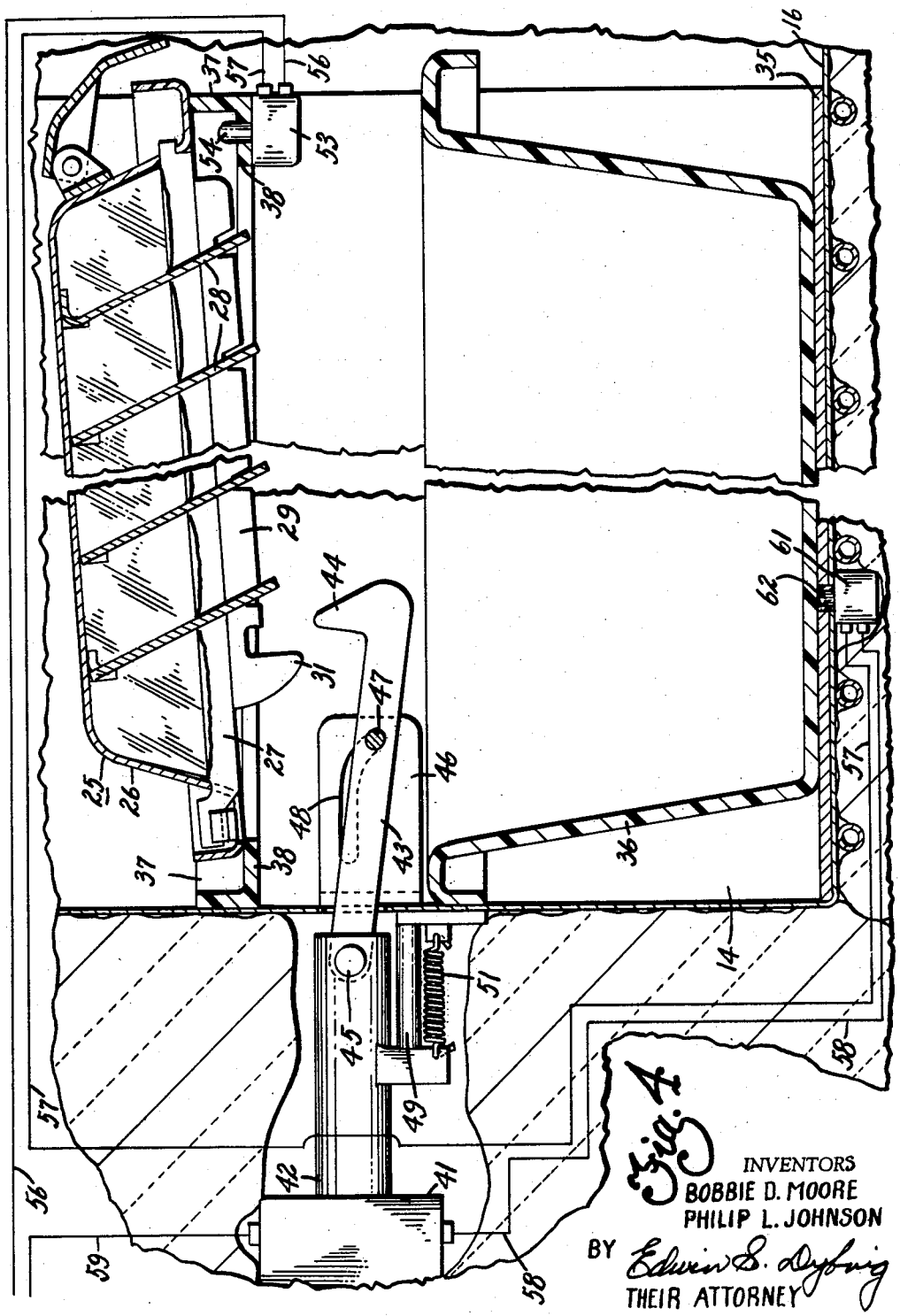
Figure 5:
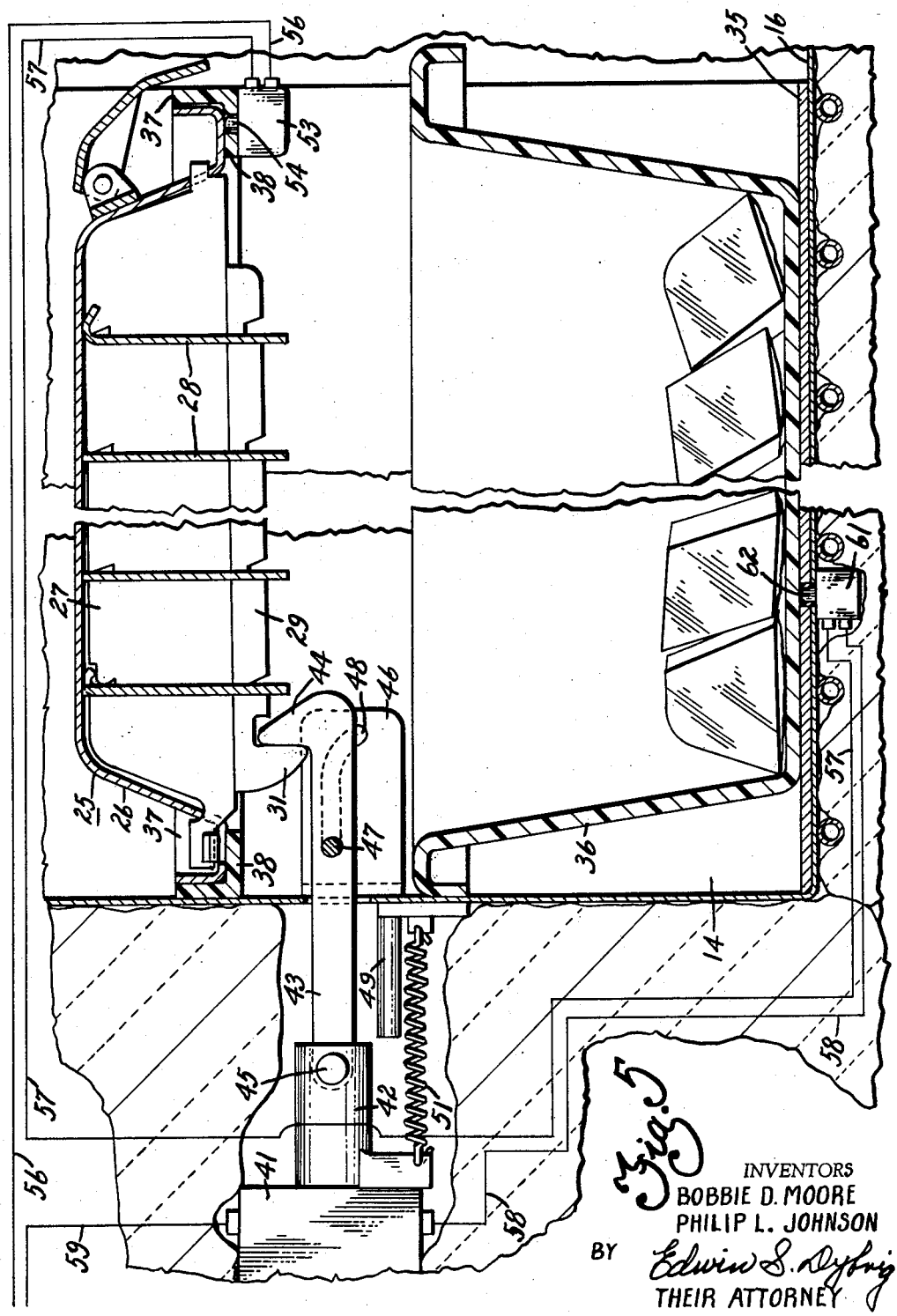

Figure 4 is an enlarged fragmentary sectional view taken on the line 4—4 of Figure 1 showing a unitary freezing device inverted and located in a position readied to be supported on a support element of the present ice block harvesting arrangement; and Figure 5 is a view similar to Figure 4 and shows the ice block ejecting mechanism after having been moved into a position to eject ice blocks from the freezing device into a storage receptacle therebelow.

Referring to the drawings, for illustrating our invention, we show in Figure 1 thereof a refrigerating apparatus including an insulated household refrigerator cabinet 10 of the multiple chamber type in which the present invention is incorporated. It is however, to be understood that while we show our ice block releasing arrangement as being built in the refrigerator cabinet the arrangement can be outside the cabinet, if desired, without departing from the spirit of the present invention. Cabinet 10 is provided with a lower unfrozen food storage chamber 11 which is cooled to a temperature of from, for example, 37° to 43° F. by a plate-like sheet metal evaporator 12 of a refrigerating system associated with the cabinet. Evaporator 12 is located behind a protecting or concealing cover or baffle 13. Cabinet 10 is also provided with an upper or frozen food storage chamber 14 which is cooled to a temperature well below 30° F. for the storage of frozen foods, for freezing foods and/or for freezing water in freezing devices removably disposed in chamber 14 into ice blocks for table use in chilling salads or the like and drinks in glasses. Chamber 14 is refrigerated by an evaporator 15, of the refrigerating system associated with cabinet 10, which evaporator is in the form of a conduit coiled or wrapped around the outside of and secured in contact with a metal can-like member 16 forming the liner of chamber 14 (see Figures 1, 4 and 5). A door 17, shown broken away in Figure 1, is hingedly mounted at the front of chamber 14 to provide an individual closure for the access opening thereof as is conventional in the art. Another insulated main door structure 18, hingedly mounted on cabinet 10 for horizontal swinging movement relative thereto, extends across the front of both chambers 11 and 14 and is provided with a resilient gasket 19 for sealingly engaging the front face of cabinet 10. A plurality of vertically spaced apart shelves 21 are secured, in any suitable or desirable manner, directly to a side wall of liner 16 of chamber 14 so as to be in metal-to-metal contact therewith and consequently with evaporator 15. Each shelf 21 is adapted to support, in an upright position, a unitary freezing device of the tray and grid type, generally represented by the reference numeral 25 in Figure 1, and shown more clearly in other figures of the drawings.

Each of the unitary freezing devices 25 includes an elongated sheet metal pan or tray 26 and a grid structure locked therein against detachment therefrom. The grid of each freezing device 25 comprises a central longitudinal partition or wall 27 and a plurality of substantially inflexible metal transverse walls 28 anchored or interlocked thereto and movable about their anchoring points within the tray 26. An actuating member 29, located above partition 27, extends along the length of tray 26 across the transverse walls 28 and is adapted to engage and move these walls. This member 29 is vertically aligned with wall or partition 27 and is shiftable along the top thereof relative to the tray of a freezing device 25.

The walls 28 normally lie in an acute angular plane and are inclined with respect to the vertical. Walls 28 are adapted to be moved or tilted, while locked in tray 26, toward the vertical one after another in succession from end to end of a freezing device 25 to progressively enlarge the compartments therebetween and release ice blocks therefrom. The construction and operation of a unitary freezing device 25 as herein disclosed is now well known to those skilled in the art thus it is unnecessary to describe same in detail herein. We prefer to employ unitary freezing devices in the presently disclosed arrangement of the character shown and fully described in the copending application of Sharpe and Sucro, S.N. 634,020 filed January 14, 1957 and assigned to the assignee of this application, with certain modifications thereof as will now be described. The present disclosure differs from that shown in said copending application since we have turned the grid around in the tray so as to incline the grid walls toward the handle or front end of the tray instead of toward the rear end thereof and to position the hook-like end 31 of the grid wall actuating member 29 adjacent the rear end of the tray. These modifications and the reference to said copending application should suffice for a clear understanding of the present disclosure. Our preference of using a unitary freezing device in the improved arrangement we have devised of the character referred to over other such similar devices is based on the feature incorporated therein for automatically returning the grid cross walls to their normal inclined position after they have been moved or tilted toward the vertical to release ice blocks from the device.

According to our invention we mount a rectangular sleeve-like metal wall structure, generally represented at 35 in Figure 1, in chamber 14 and rigidly secure same therein in any suitable or desirable manner. An ice block storage receptacle or portable ice bucket 36 is removably disposed in chamber 14 and rests on the bottom of the rectangular wall structure 35. This receptacle or bucket is adapted to receive ice blocks released from a freezing device 25 in a manner to hereinafter be described. A molded plastic or the like frame 37 (see Figure 4), forming a freezing device receiving and support element 38, is rigidly mounted within the rectangular wall structure 35 in any desired or conventional manner. A mechanism is associated with the frame 37 and support 38 and this mechanism comprises an electrically operable means or electromagnet in the form of a conventional solenoid including a steel jacket 41 containing a coil of wire windings and a movable plunger 42. This solenoid may be mounted within the rear insulated wall of cabinet 10 and supported therein in any suitable fashion. The mechanism also comprises a movable part or link 43 provided with a hook-like end 44 pivotally connected to the solenoid plunger 42 by a pin 45. Link 43 is located midway between sides of the rectangular metal wall structure 35 and this movable part of the mechanism is projected through a slot or aperture provided in the rear portion of liner 16 of chamber 14 so as to extend thereinto with its hooked end 44 below the support 38 in a position centrally of sides of the support to register with and engage the hook-like end 31 of actuating member 29 on a freezing device 25 adapted to be invertedly placed on the support element 38. A bracket or a pair of brackets 46 on either side of link 43 secured to the back of liner 16 movably support the hooked end 44 of this link. The movable part or link 43 of the mechanism carries a stud or pin 47 rigidly secured thereto and which projects into a curved camming slot 48 provided in the bracket or brackets 46 for a purpose to be described in the operation of the present disclosure. Plunger 42 of solenoid 41 is normally biased outwardly of the solenoid against a stop 49, by a spring 51, so as to hold the link 43 in the position thereof shown in Figure 4 of the drawings. An electric switch 53 mounted on the underside of the front end of frame 37 beneath support 38 has a spring pressed plunger or button 54 projecting therefrom through a hole provided in the support element 38 so as to bias the button 54 into a position above this support for engagement by a rim formed around the tray 26 of a freezing device 25 adapted to be placed on the support. Switch 53 is of a conventional type wherein its button 54 upon being depressed, by the weight of a freezing device 25, momentarily closes contacts in the switch to complete an electric circuit through wires 56, 57, 58 and 59 leading from a source of electric current to the solenoid 41 for energizing same. Further or complete depression of button 54 thereafter opens the contacts of switch 53 to break the electric circuit for deenergizing the solenoid 41. Another electric switch 61, having contacts connected to wires 57 and 58, is provided with a spring pressed button 62 which projects through a hole in liner 16 and an aligned hole provided in the bottom portion of wall structure 35 so that the end of button 62 is biased upwardly above the lower part of wall structure 35 into chamber 14. The biasing spring of switch 61 for button 62 is light and is capable of being overcome by the weight of the storage receptacle or portable ice bucket 36. Thus as long as bucket 36 is positioned in chamber 14, below the freezing device support element 38, button 62 of switch 61 is depressed to close the contacts of this switch and complete the electric circuit through wires 57 and 58 whereby to render switch 53 effective to close and open the circuit to solenoid 41 for a purpose and in a manner to be presently described. Removal of storage receptacle or ice bucket 36 from chamber 14 causes the spring in switch 61 to bias its button 62 upwardly into this chamber whereupon contacts of switch 61 will break or open the circuit through wires 57 and 58 to render switch 53 and consequently solenoid 41 and the operable mechanism disclosed ineffective. Switch 61 is therefore a precautionary or safety element, which operates only when the ice receptacle or bucket 36 is removed from chamber 14, to prevent ice blocks being released or ejected from a freezing device 25 placed on the support element 38. Therefore the ice bucket 36 must be in position within the freezing chamber 14 of refrigerator cabinet 10, for receiving ice blocks from a freezing device 25, in order to render the present ice block ejecting mechanism effective. This safeguards against ejected ice blocks being scattered around in chamber 14 of the refrigerator or falling out of the chamber when its door 17 is opened. The slot in liner 16 through which link 43 projects can be provided with a proper air seal and provisions may be made to effectively insulate brackets 46 and switch 61 together with its button 62 from the low temperature of liner 16 of freezing chamber 14 to minimize frost accumulation on these elements.

After water has been hard-frozen into separate ice blocks within compartments of the upright freezing device 25, on shelves 21 in the frozen food storage and freezing chamber 14 of cabinet 10, any selected one of the unitary freezing devices is removed from a shelf 21. Assume now that receptacle or ice bucket 36 is positioned in chamber 14 within the wall structure 35 and that contacts of switch 61 are closed. The freezing device removed from a shelf 21 together with its grid and ice blocks therein is rotated into an inverted position and then placed upside down on support element 38. In Figure 4 of the drawings we show a unitary freezing device so inverted into association with frame 37 and about to be pushed or slid, in cradled fashion, onto or into the support element 38. Upon moving the unitary freezing device 25 onto or into frame 37 portions of the rim on tray 26 are supported thereby by the support element 38. When a freezing device 25 is placed in cradled fashion on support 38 the front rim portion of tray 26 engages and depresses the button 54 of switch 53 to momentarily close contacts of this switch for directing a pre-selected timed charge of electric current through wires 56, 57, switch 61 and wires 58 and 59 to solenoid 41 for energizing this electrically operable means. The duration of the timed energization of solenoid 41 is dependent upon the length of time contacts of switch 53 are closed during the initial depressing movement of switch button 54 and after this timed interval elapses, by button 54 being completely depressed, contacts of switch 53 open automatically to interrupt the current to solenoid 41 irrespective of whether the unitary freezing device 25 remains supported on support 38 or is removed therefrom. Energization of the electromagnet or solenoid 41 draws plunger 42 thereinto and consequently moves the lever or link 43 whereupon pin 47 sliding in curved slot 48, in the brackets 46, rises and cams the hook end 44 of link 43 into engagement with the hook-like end 31 on actuating member 29 of the invertedly supported freezing device 25. Continued movement of plunger 42 into solenoid 41 moves link 43 further to the left, as shown in Figure 5 of the drawings, and shifts actuating member 29 into engagement with the grid walls 28 whereby these inclined walls are tilted toward the vertical about their anchoring points, while locked in tray 26, to break bonds between the ice blocks and grid and tray. Due to the construction of the grid and actuating member 29 in device 25, which is now conventional in the art, the transverse grid walls are tilted one after another in succession from end to end of the device to progressively release ice blocks and which action reduces to a minimum force required to be applied to the grid thus aiding in the utilization of an electromagnet or solenoid for the purpose described. Tilting of the inclined grid walls 28 also enlarges ice block compartments therebetween whereby the loosened ice blocks are released or ejected from the inverted unitary freezing device 25 and freely fall into the storage receptacle or portable ice bucket 36 (see Figure 5). The upstanding rear end part of frame 37 above support 38 thereon forms a fixed means on the support element which is abutted by the tray 26, during movement of the ice releasing mechanism herein disclosed, to hold the tray stationary on its support against sliding relative thereto. After release of ice blocks from the unitary freezing device 25 and upon removal of same from support 38 the spring 51 pulls or biases plunger 42 of solenoid 41 against the stop 49 and also moves the link 43 to its normal position as shown in Figure 4 of the drawings. If the ice bucket 36 is removed from chamber 14, for dispensing ice blocks therefrom into glasses at a dinner or at a cocktail serving table remote from refrigerator 10, switch 61 renders the mechanism inoperative by opening the electric circuit to switch 53. Should another freezing device 25 be invertedly placed on the support 38 at this time solenoid 41 will not be energized and no ice blocks can be ejected from the supported device and consequently the danger of having ice blocks unconfined in a receptacle and scattered about at random in compartment 14 while receptacle 36 is removed therefrom is eliminated.

By harvesting ice blocks from a unitary freezing device automatically, in response to invertedly placing a device in supported position on a support element, as herein disclosed it should be apparent that we have provided an improved arrangement in this art. Our improved arrangement negatives the necessity of a housewife exerting energy during an ice block harvesting operation and provides a method of releasing ice blocks from a freezing device which is simple and easily carried out. The arrangement is such that a child can, without the assistance of an adult, release ice blocks from a freezing device at any time ice blocks are desired to cool drinks in glasses. While we show our improved ice releasing and harvesting arrangement incorporated within the freezing chamber of a refrigerator cabinet it is, as hereinbefore set forth, to be understood that the arrangement may be incorporated in or on a door of the cabinet or it may, if preferred, be incorporated in or on a unitary portable combined freezing device support and ice bucket structure for use at work ledges or tables remote from the refrigerator cabinet.

While the form of embodiment of the invention as herein disclosed constitutes a preferred form, it is to be understood that other forms might be adopted, as may come within the scope of the claims which follow.

What is claimed is as follows:

1. In combination, a refrigerator having a chamber therein, a refrigerating system associated with said refrigerator including an evaporator for cooling said chamber to a temperature below 32° F., a unitary freezing device normally disposed in said chamber, a freezing device receiving and supporting element for use in conjunction with said refrigerator and said unitary freezing device, said freezing device comprising a tray and a grid locked in said tray against detachment therefrom, said grid including a plurality of spaced apart substantially inflexible walls separate from and independent of walls of the tray anchored in said tray for movement relative thereto and dividing the interior thereof into compartments in which water is to be frozen into separated ice blocks, said grid also including an actuating member extending across said plurality of grid walls and adapted to engage and apply force thereto while the grid remains locked in said tray, a mechanism including an electrically operable means and a part movable thereby adapted to engage a portion of said actuating member when said freezing device is supported on said support element, said freezing device together with said grid and ice blocks therein being removable from said chamber, rotatable into an inverted supported position on said element with said portion of said actuating member removably registering with said movable part of the mechanism for engagement therewith, a switch associated with said support element and actuated in response to placing said freezing device thereon for energizing said electrically operable means and moving said mechanism, and the movement of said mechanism causing said movable part thereof to engage said portion of said actuating member for shifting the member relative to said support element and the freezing device invertedly suported thereon to move said grid walls locked in said tray whereby to release ice blocks from the device.

2. The combination defined by claim 1 wherein a fixed means associated with the support element holds the tray of the inverted freezing device stationary on the element during movement of the mechanism.

3. In combination, a refrigerator having a chamber therein, a refrigerating system associated with said refrigerator including an evaporator for cooling said chamber to a temperature below 32° F., a unitary freezing device normally disposed in said chamber, a freezing device receiving and supporting element for use in conjunction with said refrigerator and said unitary freezing device, said unitary freezing device comprising an elongated metal tray and a grid structure locked in said tray against detachment therefrom, said grid structure including a plurality of substantially inflexible walls separate from and independent of walls of the tray spaced apart along the length thereof and inclined with respect to the vertical anchored in said tray for tilting movement relative thereto dividing the interior thereof into compartments in which water is to be frozen into separated ice blocks, said grid structure also including an actuating member extending along the length of said tray across said plurality of inclined grid walls and adapted to engage and tilt same while the grid remains locked in said tray, a mechanism including an electrically operable means and a movable part adapted to engage a portion of said actuating member when said freezing device is supported on said support element, said freezing device together with said grid and ice blocks therein being removable from said chamber, rotatable into an inverted supported position on said element with said portion of said actuating member removably registering with said movable part of said mechanism for engagement therewith, a switch associated with said support element and actuated in response to placing said unitary freezing device thereon for energizing said electrically operable means and moving said mechanism, and the movement of said mechanism causing said movable part thereof to engage said portion of said actuating member for shifting the member lengthwise along said support element and the freezing device invertedly supported thereon to tilt said inclined grid walls locked in the tray toward the vertical to enlarge said compartments and mechanically release ice blocks from the device.

4. The combination defined by claim 3 wherein a fixed means associated with the support element holds the tray of the inverted freezing device stationary on the element during movement of the mechanism.

5. In combination with a refrigerator, a freezing device comprising a tray and grid walls anchored therein for tilting movement with respect thereto dividing the interior of said tray into compartments in which water is frozen within a low temperature portion of the refrigerator into separated ice blocks, a support element for use in conjunction with said refrigerator and said freezing device adapted to receive and support the device thereon, a mechanism associated with said support element including an electrically operable means having a part movable thereby and switch means controlling said electrically operable means, and said tray and said grid walls of said freezing device together with ice blocks therein being manually removable from said portion of said refrigerator and placeable in an inverted stationarily held supported position on said support element for engaging and actuating said switch means to energize said electrical means whereby said movable part thereof applies force to said grid walls and tilts them relative to said tray for mechanically releasing the separated ice blocks from said freezing device.

6. In combination with a refrigerator, a freezing device comprising a tray and grid walls anchored therein for tilting movement with respect thereto dividing the interior of said tray into compartments in which water is frozen within a low temperature portion of the refrigerator into separated ice blocks, a support element for use in conjunction with said refrigerator and said freezing device adapted to receive and support the device thereon, a receptacle removably disposed below said support element, a mechanism associated with said support element including an electrically operable means having a part movable thereby and a first switch means controlling said electrically operable means, a second switch means associated with said receptacle, said tray and said grid walls of said freezing device together with ice blocks therein being manually removable from said portion of said refrigerator and placeable in an inverted stationarily held supported position on said support element for engaging and actuating said first switch to energize said electrical means whereby said movable part thereof applies force to said grid walls and tilts them relative to said tray for mechanically releasing the separated ice blocks from said freezing device into said receptacle, and said second switch means being actuated automatically in response to moving said removable receptacle away from said support element for rendering said first switch means ineffective to energize said electrically operable means.

References Cited in the file of this patent

UNITED STATES PATENTS

| | | |
|---|---|---|
| 2,782,609 | Galin | Feb. 26, 1957 |
| 2,829,506 | Sharpe | Apr. 8, 1958 |